(12) United States Patent
Nurmi

(10) Patent No.: US 6,647,930 B2
(45) Date of Patent: Nov. 18, 2003

(54) AMMONIA VAPOR GENERATION

(75) Inventor: Douglas B. Nurmi, McKinney, TX (US)

(73) Assignees: L'Air Liquide-Societe Anonyme à Directoire et Conseil de Surveillance pour l'Etude et l'Exploitation des Procedes Georges Claude, Paris (FR); Air Liquide America, L.P., Houston, TX (US)

( * ) Notice: Subject to any disclaimer, the term of this patent is extended or adjusted under 35 U.S.C. 154(b) by 0 days.

(21) Appl. No.: 10/358,095

(22) Filed: Feb. 4, 2003

(65) Prior Publication Data

US 2003/0159811 A1 Aug. 28, 2003

Related U.S. Application Data

(60) Provisional application No. 60/356,106, filed on Feb. 11, 2002.

(51) Int. Cl.[7] .................................................. F22B 3/02
(52) U.S. Cl. ........................ 122/4 R; 252/374; 423/360
(58) Field of Search .......................... 122/1 R, 4 R, 122/21; 252/373, 374, 375, 376; 423/359, 360, 361, 362, 363

(56) References Cited

U.S. PATENT DOCUMENTS

| | | | | |
|---|---|---|---|---|
| 4,172,652 A | * | 10/1979 | Stein | ........................ 396/579 |
| 4,469,665 A | * | 9/1984 | Pinto | ........................ 423/359 |
| 4,544,390 A | * | 10/1985 | Traficante | .................... 62/632 |
| 5,456,086 A | * | 10/1995 | Hanna | ........................ 62/101 |
| 5,846,386 A | | 12/1998 | Hoffman et al. | |
| 5,857,355 A | | 1/1999 | Hwang | |
| 6,077,459 A | * | 6/2000 | Laursen et al. | ............. 252/376 |

* cited by examiner

Primary Examiner—Gregory Wilson
(74) Attorney, Agent, or Firm—Linda K. Russell

(57) ABSTRACT

A system for ammonia vapor generation includes a liquid ammonia supply source, a vapor generation tank including an inlet to receive liquid ammonia from the supply source and an outlet to discharge ammonia gas from the vapor generation tank, a first heat transfer system to cool liquid ammonia fed from the supply source to the vapor generation tank and to provide external cooling to the vapor generation tank, and a second heat transfer system to heat liquid ammonia within the vapor generation tank. The first and second heat transfer systems facilitate the discharge of ammonia gas from the vapor generation tank at a substantially constant flow rate and pressure.

35 Claims, 3 Drawing Sheets

AMMONIA VAPOR GENERATION

CROSS REFERENCE TO RELATED APPLICATION

This application claims priority from U.S. Provisional Patent Application Ser. No. 60/356,106, entitled "Ammonia Vapor Generator" and filed Feb. 11, 2002. The disclosure of the above-mentioned provisional application is incorporated herein by reference in its entirety.

BACKGROUND OF THE INVENTION

1. Technical Field

The present invention pertains to ammonia vapor generation systems and methods for delivering high purity ammonia to facilities at desired flow rates.

2. Discussion of the Art

High purity ammonia is required in ever increasing quantities for the manufacture of semiconductor devices as well as a number of manufacturing processes. In such manufacturing processes, ammonia is typically shipped in liquid form in containers to facilities for use in each process. Due to its low vapor pressure at normal ambient temperatures and the high flow rates that are typically required, the ammonia must be heated to achieve a suitable vapor pressure for delivering ammonia at a suitable flow rate.

In addition, ammonia gas experiences a significant Joules-Thompson cooling effect when forced through an orifice, such as a regulator. Thus, the temperature and pressure of the ammonia gas must be closely monitored to prevent undesirable temperature changes from occurring within the manufacturing process. Further, in order to obtain the purity required for the ammonia gas, many manufacturing processes require purification equipment disposed within the manufacturing system. Impurities that need to be removed from the ammonia feed include Group I and II metals, as well as amines, oxides and carbonates of these metals.

Thus, there exists a need to provide an ammonia vapor generation system that provides high purity ammonia gas at a suitable and relatively constant flow rate and a selected temperature and pressure.

OBJECTS AND SUMMARY OF THE INVENTION

Accordingly, it is an object of the present invention to provide ammonia gas at a selected flow rate for a particular process.

It is another object of the present invention to control the temperature and pressure of the ammonia gas as it is delivered to a particular process.

It is a further object of the present invention to provide ammonia gas in an efficient manner and at a suitable purity level for a particular process.

It is still another object of the present invention to provide an ammonia gas at a substantially continuous flow rate and a substantially constant pressure.

The aforesaid objects are achieved individually and/or in combination, and it is not intended that the present invention be construed as requiring two or more of the objects to be combined unless expressly required by the claims attached hereto.

According to the present invention, an ammonia vapor generation system includes a liquid ammonia supply source, a vapor generation tank including an inlet to receive liquid ammonia from the supply source and an outlet to discharge ammonia gas from the vapor generation tank, a first heat transfer system to provide external cooling to the vapor generation tank, and a second heat transfer system to heat liquid ammonia within the vapor generation tank. The first and second heat transfer systems facilitate the discharge of ammonia gas from the vapor generation tank at a substantially constant flow rate. In particular, the first heat transfer system cools liquid ammonia being fed to the vapor generation tank and maintains the liquid ammonia within the tank at a selected temperature during a first time period after initiation of system operation. The second heat transfer system provides heat to the liquid ammonia within the tank after the first time period. The system is capable of providing a constant flow rate of ammonia gas from the vapor generation tank of at least about 1000 standard liters per minute.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
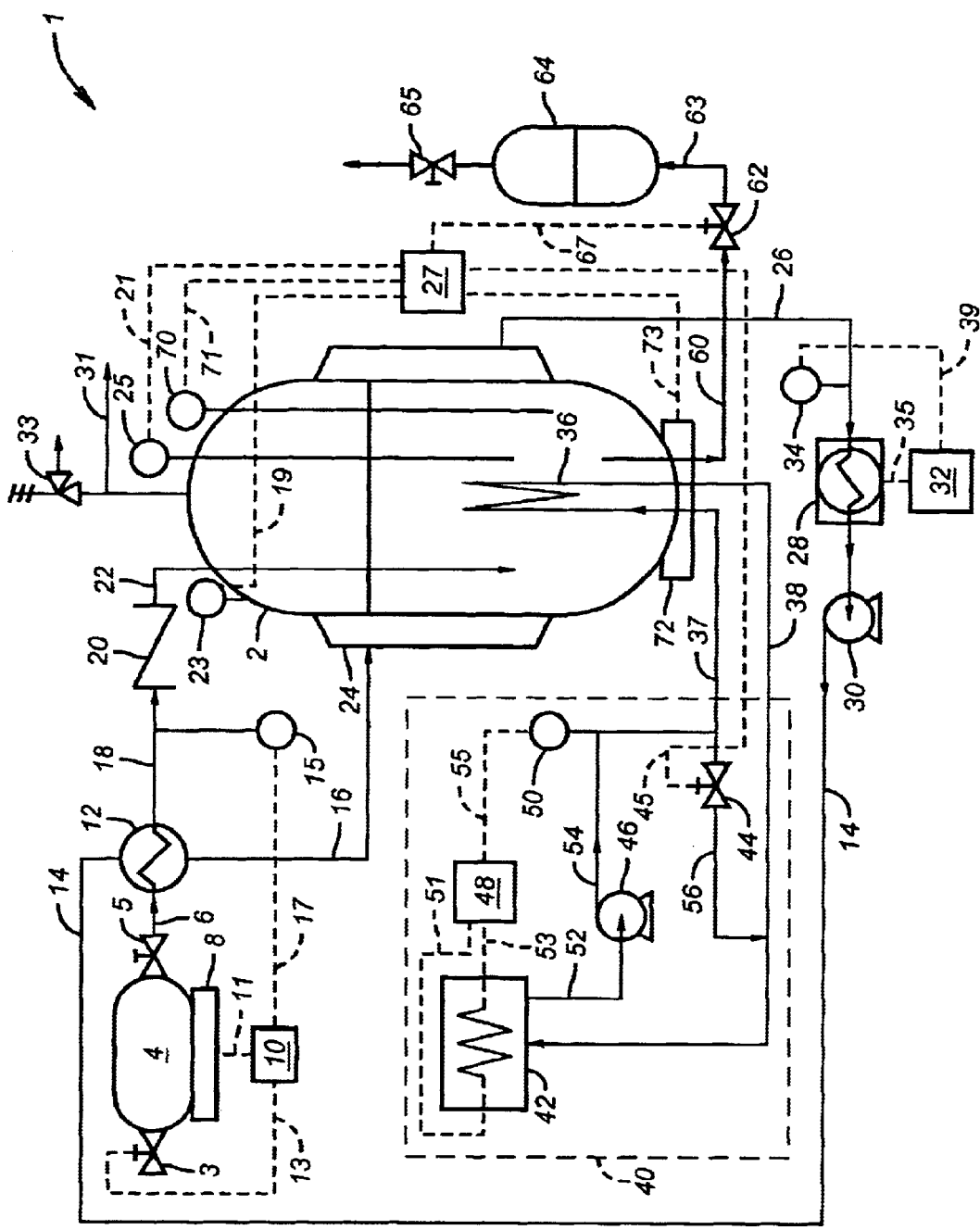
FIG. 1 is a flow diagram of an ammonia vapor generation system of the present invention.

An ammonia vapor generation system of the present invention is depicted in FIG. 1 and includes an ammonia vapor generation tank that receives liquid ammonia from an ammonia supply source and generates ammonia gas at a selected flow rate for delivery to a manufacturing facility. Preferably, ammonia gas is generated in the vapor generation tank for delivery at a substantially continuous flow rate of about 1000 standard liters per minute (SLPM) and a pressure of about 500 kPa absolute (75 psia) to the manufacturing facility.

The vapor generation tank, ammonia supply source, and various other components of the system may be constructed of any suitable materials that are corrosion resistant and have sufficient strength to withstand system operating pressures. A preferred material of construction for the vapor generation tank and other system components is stainless steel, most preferably 316 L stainless steel.

The ammonia supply source may be, e.g., a ton unit, a bulk tank or any other suitable storage system for the liquid ammonia. If the supply source is disposed in a normal ambient environment that yields a temperature for the liquid supply of ammonia of at least about 21° C. (70° F.), the vapor pressure of ammonia in the supply source will be at least about 850 kPa absolute (123 psia), which is adequate to supply liquid ammonia feed to the vapor generation tank at a suitable flow rate. Alternatively, if the ambient temperature surrounding the liquid supply is such that the vapor pressure of the ammonia is too low, a desired flow rate for the ammonia to the vapor generation tank can be achieved, e.g., by heating a fraction of the liquid ammonia from the supply source and/or providing a pump in line between the supply source and the tank.

Referring to FIG. 1, system 1 includes a vapor generation tank 2 connected to an ammonia storage and supply tank 4 via suitable piping. Preferably, the vapor generation tank has an internal volume of at least about 76 liters (20 gallons) to facilitate a sufficient generation and supply of ammonia gas at a constant flow rate.

Supply tank 4 includes an inlet valve 3 to receive additional ammonia supply as required from another source (not shown) and an outlet valve 5 to control the flow of liquid ammonia from the supply tank. When the supply tank is disposed in an ambient temperature environment of at least about 21° C., the vapor pressure of ammonia gas in the supply tank is sufficient to drive liquid ammonia from the supply tank and through the outlet valve into a feed stream 6 at a suitable flow rate (e.g., about 1 SLPM). Preferably, the amount of liquid ammonia within the supply tank is monitored utilizing a scale 8 that supports and continuously measures the weight of the supply tank. A supply tank controller 10 is coupled to scale 8 and input valve 3 (e.g., via electrical wiring or any type of wireless connection, as indicated by dashed lines 11 and 13 in FIG. 1) to facilitate communication between the controller, the scale and the input valve. It is noted that controller 10, as well as the other controllers for system 1 described below, may be any commercially available or other suitable type of programmable logic controller (PLC). The controller receives weight measurements from the scale and, when the weight drops below a minimum threshold value, the controller effects opening of valve 3 to receive a feed of liquid ammonia until the weight measured by the scale is within a suitable range of the threshold value. Alternatively, a liquid level controller including a sensor disposed within the supply tank or any other suitable monitoring device may be employed to monitor and maintain a selected amount of liquid ammonia within the supply tank.

A heat exchanger 12 is disposed downstream from supply tank 4 to receive liquid ammonia from feed stream 6. Preferably, the heat exchanger will be of the tubular type (tube-in-tube), with the liquid ammonia flowing through the inner tubes and a heat transfer fluid, typically a coolant (e.g., ethylene glycol), flowing through the outer tube surrounding the inner tubes. The coolant is fed in an inlet stream 14 to the heat exchanger outer tube and is discharged from the heat exchanger as stream 16. The temperature and pressure of the coolant flowing through the heat exchanger is controlled in a manner described below to cool the liquid ammonia to a selected temperature prior to entering the vapor generation tank. In a preferred embodiment, liquid ammonia is cooled to a temperature of about 10° C. (50° F.) prior to entering the vapor generation tank. By reducing the temperature of the liquid ammonia in the vapor generation tank, the vapor pressure of ammonia gas discharged from the tank is also reduced to a level approximating the delivery pressure typically required in manufacturing facilities. Thus, little or no pressure regulation is necessary prior to delivery of the ammonia gas to the facility.

Liquid ammonia emerging from the heat exchanger in stream 18 passes through a check valve 20 and is delivered into vapor generation tank 2 via stream 22. Optionally, a pressure sensor 15 is provided to measure the pressure of liquid ammonia in stream 18. The pressure sensor may be coupled to controller 10 (via electrical wiring and/or wireless connections, as indicated by dashed line 17 in FIG. 1) to provide additional input information for maintaining a selected flow rate of the liquid ammonia into tank 2.

The inlet location of liquid ammonia within the vapor generation tank is preferably disposed at the bottom of the tank to minimize any potential effects between the bulk liquid ammonia and ammonia vapor in the tank during system operation. During system startup and an initial time period of system operation, the temperature of the liquid ammonia within vapor generation tank 2 must be cooled in order to maintain the selected temperature (e.g., about 10° C.). However, as ammonia gas is generated within tank 2, the temperature of liquid ammonia within the tank will decrease due to the heat of vaporization requirements for producing the ammonia gas. Accordingly, at a certain time period after system startup, heat must be applied to the vapor generation tank to ensure the temperature of the contents therein remains substantially constant, thus ensuring a substantially constant vapor pressure and flow rate of ammonia gas from the tank to the manufacturing facility. Initial cooling and subsequent heating of the ammonia within the generating tank is accomplished utilizing both internal and external heat transfer systems as described below.

The vapor generation tank includes a pressure sensor 23 to measure the vapor pressure within the tank and a temperature sensor 25 to measure the temperature of the liquid ammonia within the tank. It is noted that temperature sensors utilized in system 1 may be of any suitable type (e.g., RTD, IR, thermistor, thermocouple, etc.) to measure the temperature of liquid and/or vapor ammonia or any other fluid during system operation. Further, pressure sensors utilized in system 1 may also be of any suitable type (e.g., electromechanical, piezoelectric, capacitive, etc.) to measure the pressure of liquid and/or vapor ammonia or any other fluid during system operation. A vapor generation controller 27 is coupled to pressure and temperature sensors 23 and 25 (e.g., via electrical wiring and/or wireless connections, as indicated by dashed lines 19 and 21 in FIG. 1) to receive measured vapor pressure and liquid ammonia temperature information from the sensors in order to effect control of the internal heat transfer system in a manner described below.

An outlet stream 31 disposed near a top portion of vapor generation tank 2 delivers ammonia gas discharged from the tank to a manufacturing facility at the selected flow rate (e.g., 1000 SLPM) and pressure (e.g., 500 kPa absolute). For safety purposes, a relief valve 33 is positioned on a branch line from the outlet stream to vent discharged ammonia gas at pressures exceeding a selected threshold value. Optionally, two or more relief valves may be employed and connected to each other utilizing one or more switching valves. Alternatively, or in addition to a relief valve being disposed along the outlet stream, one or more relief valves may be connected directly with the vapor generation tank to release high pressure vapor that exceeds a selected threshold within the tank.

The external heat transfer system for maintaining the temperature of ammonia at the selected temperature includes a heat transfer jacket 24 disposed around a selected portion of the exterior surface of vapor generation tank 2. The heat transfer jacket receives coolant from outlet stream 16 emerging from heat exchanger 12 and discharges the coolant in stream 26. Coolant stream 26 is then passed through a heat transfer unit 28 and a circulation pump 30 disposed downstream from the heat transfer unit. Stream 14 emerges from the circulation pump at a suitable temperature and pressure and is recycled back to heat exchanger 12 for cooling the liquid ammonia supply. A temperature controller is coupled to each of the heat transfer unit and a temperature sensor 34 disposed upstream of the heat transfer unit (e.g., via electrical wiring and/or wireless connections, as indicated by dashed lines 35 and 39 in FIG. 1) to measure the temperature of coolant stream 26. The temperature sensor sends temperature information to controller 32, and the controller accordingly controls the heat transfer unit to achieve a desired temperature of the coolant prior to the coolant being recycled to heat exchanger 12.

In an exemplary embodiment, the heat transfer unit is a chiller to effect cooling of the coolant to the desired temperature prior to being delivered to heat exchanger 12. In this embodiment, the coolant is only utilized to cool the vapor generation tank in the startup stages of system operation when cooling is necessary for the liquid ammonia in the vapor generation tank. At a certain period during ammonia vapor generation, the vapor generation tank no longer requires cooling. Instead, the liquid ammonia in the vapor generation tank must now be heated to maintain the liquid ammonia at the selected temperature. Thus, the cooling requirements of heat transfer unit 28 will be reduced or diminished as system operation approaches and achieves steady state. While the coolant may still need some cooling prior to being recycled to the heat exchanger, the amount of cooling will be reduced since relatively no heat is removed from the coolant by the ammonia vapor generation tank at steady state. Optionally, a bypass valve (not shown) may even be provided in coolant stream 16 to divert the flow of coolant directly to the heat transfer unit (i.e., bypassing the thermal transfer jacket) at a point in time when cooling is no longer necessary for the vapor generation tank.

In an alternative embodiment, heat transfer unit 28 is a heat pump capable of both heating and cooling the coolant to the desired temperature. The heat transfer unit would initially cool the coolant to the desired temperature during system startup. When the system is continuously producing enough ammonia gas and the heat of vaporization requirements are such that the liquid ammonia requires heating rather than cooling, the coolant may be heated by unit 28 as necessary to maintain the desired temperature prior to delivery to heat exchanger 12. In this manner, the external heat transfer system operates to both cool the liquid ammonia during initial system startup as well as provide supplemental heating in addition to the internal heat transfer system, as described below, during the remainder of system operation.

An internal heat control system for the vapor generation tank includes a tubing coil 36 disposed internally at a lower portion within the tank to ensure the coil is submerged in liquid ammonia during steady state system operation. The tubing coil is preferably constructed of stainless steel or any other suitably corrosion resistant material and has a suitable dimension and surface area to facilitate sufficient heat transfer to the liquid ammonia within tank 2. A suitable heating medium (e.g., a heat transfer oil) is circulated between tubing coil 36 and a heat control circuit 40 disposed externally from the vapor generation tank, with an inlet stream 37 delivering heating medium from circuit 40 into coil 36 and an outlet stream 38 delivering heating medium discharged from the coil back to the circuit.

Heat control circuit 40 includes a heater unit 42, a diverter or bypass valve 44 to divert heating medium flow within the circuit, and a circulating pump 46 to circulate heating medium through the circuit and tubing coil. The circulating pump preferably has a capacity of at least about 28.4 liters per minute (7.5 gallons per minute). The heater unit is preferably an electrical heater with a suitable heat generating capacity (e.g., about 14 kW) to achieve a temperature for the heating medium that is sufficient to sustain the selected vapor pressure of ammonia gas and the selected temperature of liquid ammonia in the vapor generation tank. In a preferred embodiment, the temperature of the heating medium entering the tubing coil is heated to about 65.6° C. (150° F.) in order to maintain the liquid ammonia temperature at about 10° C. and the vapor pressure at about 600 kPa absolute (87 psia) within the vapor generation tank. A temperature controller 48 is coupled to the heater unit and a temperature sensor 50 disposed downstream from the heater unit (e.g., via electrical wiring and/or wireless connections, as indicated by dashed lines 51, 53 and 55 in FIG. 1) to facilitate control the temperature of the heating medium as described below.

Heating medium stream 38 is discharged from the tubing coil and is delivered to heater unit 42 within heat control circuit 40. The heating medium stream is heated by the heater unit (e.g., to about 65.6° C.) and discharged as stream 52 to circulation pump 46. The discharge stream 54 from pump 46 connects at a branched section with inlet stream 37 that delivers the heating medium from circuit 40 back to the inlet of tubing coil 36. Temperature sensor 50 measures the temperature of the heating medium in stream 54 and provides measured temperature information to controller 48. The controller controls the heat output by heater unit 42 in response to the temperature measurements received by sensor 50. Thus, the temperature of the heating medium is maintained at or within an acceptable range of the selected temperature by controller 48 in the heat control circuit.

Inlet stream 37 extends between the inlet of tubing coil 36 and one end of bypass valve 44 in circuit 40. The other end of the bypass valve connects, via a bypass stream 56, at a branch location with outlet stream 38 (i.e., the stream extending between the outlet of the tubing conduit and the inlet to heater unit 42). The bypass valve is further coupled to vapor generation controller 27 (e.g., via electrical wiring and/or wireless connections, as indicated by dashed line 45 in FIG. 1) to facilitate opening and closing of the bypass valve by controller 27 in response to pressure and/or temperature measurements within tank 2 by pressure and temperature sensors 23 and 25. The vapor generation controller preferably controls the flow of heating medium via bypass valve 44 utilizing pressure signals generated by pressure sensor 23, because a pressure sensor typically generates a measured signal at a faster rate than a temperature sensor. However, it is noted that the vapor generation controller may utilize any one or both of the signals generated by the pressure and temperature sensors to effect control of the bypass valve and, ultimately, the vapor pressure of ammonia within the vapor generation tank.

When the vapor pressure of ammonia in tank 2 drops below a threshold value (e.g., about 600 kPa absolute), which also corresponds to a drop in liquid ammonia temperature below a threshold value (e.g., about 10° C.), pressure and/or temperature information provided by sensors 23 and 25 to controller 27 results in partial or complete closing of bypass valve 44 to direct most or all of the heating medium from circuit 40 through stream 37 and into tubing coil 36. Alternatively, when the vapor pressure exceeds the threshold value, controller 27 effects partial or complete opening of the bypass valve to divert at least a portion of the heating medium into bypass stream 56, through outlet stream 38 and back to heater unit 42. Thus, at least a portion of the heating medium is prevented from flowing through the tubing coil until such time that the vapor pressure (and corresponding liquid ammonia temperature) falls within an acceptable range of the threshold value.

The system further includes a blow down connection to facilitate removal and prevent a buildup of contaminants in the bulk liquid ammonia within the vapor generation tank. Specifically, an outlet stream 60 in fluid communication with a bottom portion of tank 2 is connected to one end of a stop valve 62. The other end of the stop valve is connected, via stream 63, to a purge collection vessel 64. The purge collection vessel includes a valve 65 to vent vaporized ammonia to a safe location, while any solid contaminants are collected within the vessel. Stop valve 62 normally remains in a closed position. However, periodically the stop valve is opened to purge solid and other contaminants from the bottom of tank 2 to vessel 64. The stop valve may be opened manually or, alternatively, automatically via vapor generation controller 27. In an automatic embodiment, the stop valve is preferably coupled to the vapor generation controller utilizing electrical wiring or any other suitable wireless connection (as indicated by the dashed line 67 in FIG. 1).

A liquid control feature is further included in the system to minimize potential temperature and pressure fluctuations within the vapor generation tank. In particular, such a feature is realized within system 1 by providing at least one of a liquid level sensor 70 to sense the level of liquid ammonia within tank 2 and a scale 72 to support and continuously measure the weight of tank 2. Each of the liquid level sensor and the scale are coupled to a controller, preferably vapor generating controller 27 (e.g., via electrical wiring and/or wireless connections, as indicated by dashed lines 71 and 73 in FIG. 1). Upon achieving a steady state condition during system operation, the controller receives and analyzes measured information from the liquid level sensor and/or scale to continuously monitor the amount of liquid ammonia within the vapor generation tank. If the amount of liquid ammonia increases above a threshold value, controller 27 removes a fraction of liquid ammonia from tank 2, e.g., by opening stop valve 62, so that the amount of liquid ammonia falls within an acceptable range of the threshold value. Alternatively, when the amount of liquid ammonia drops below the threshold value (e.g., immediately after a purge removal of a bottom fraction of the liquid ammonia to collection vessel 64), a suitable liquid level can be rapidly achieved by increasing the flow of liquid ammonia feed until the threshold value reaches the acceptable range. The vapor generation controller may communicate with the supply tank controller to achieve an increase or decrease in liquid ammonia feed to the vapor generation tank as necessary during system operation.

During system operation, supply tank 4 controls the flow rate of liquid ammonia feed at a selected flow rate (e.g., 1 SLPM) by controlling the vapor pressure to a suitable level (e.g., about 850 kPa absolute) within the supply tank in a manner described above. The liquid ammonia feed travels in stream 6 through heat exchanger 12, where it is cooled by coolant stream 14 to a selected temperature (e.g., about 10° C.). The cooled liquid ammonia feed is directed into vapor generation tank 2 at a bottom location of the tank. Coolant stream 16 emerging from heat exchanger 12 is directed to heat transfer jacket 24 and is used to initially maintain liquid ammonia within tank 2 at the selected temperature (e.g., about 10° C.) until a sufficient amount of ammonia vapor is generated within the tank and heating is required within the tank as described above. The coolant emerges from the heat transfer jacket in stream 26 and is thermally treated in heat transfer unit 28 which is controlled by controller 32 as described above. The coolant emerges as stream 14 from unit 28 and is recycled back to heat exchanger 12.

Heat control circuit 40 maintains the liquid ammonia within tank 2 at the selected temperature (e.g., about 10° C.) and the ammonia gas within tank 2 at a selected vapor pressure (e.g., about 600 kPa absolute) during ammonia vapor generation. Heating medium is continuously circulated through tubing coil 36 and heater circuit 40, with bypass valve 44 controlling the amount of heating medium delivered to the tubing coil based upon pressure and/or temperature information obtained within the vapor generation tank in a manner described above. The heating medium is heated within circuit 40 by heater unit 42 to a selected temperature (e.g., about 65.6° C.) for delivery into the tubing coil in order to maintain the liquid ammonia within the vapor generation tank at its selected temperature.

A fraction of the liquid ammonia within tank 2 is purged at selected time periods during system operation via stop valve 62. The amount of liquid ammonia within tank 2 is closely monitored and controlled as described above based upon measured information by scale 72 and/or liquid level sensor 70 provided to vapor generation controller 27. Thus, the system is capable of producing ammonia gas at a substantially constant flow rate (e.g., about 1000 SLPM) and vapor pressure (e.g., about 500 kPa absolute) for delivery to a manufacturing facility via stream 31 emerging from the vapor generation tank.

Figure 2:
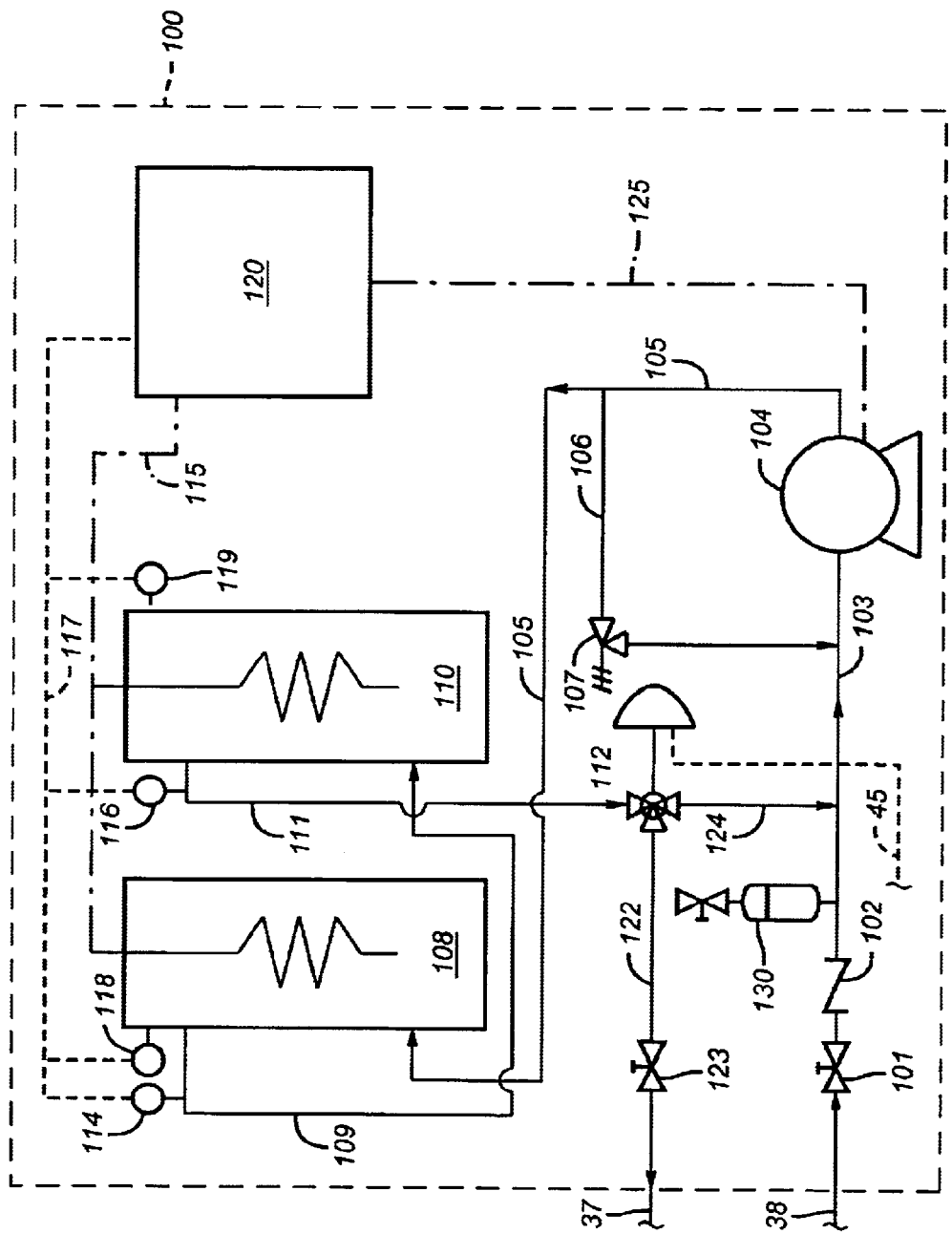
FIG. 2 is a flow diagram of an alternative embodiment for the temperature control circuit utilized to control the temperature of ammonia in the vapor generation tank for the system of FIG. 1.

The heat control circuit for system 1 may be modified to include a plurality of circulation heater units in series in order to effect more precise control of the heating medium temperature as well as heating medium flow to the tubing coil in the vapor generation tank. This will in turn permit greater system control to accommodate a large variance in vapor demand by the manufacturing facility. An exemplary embodiment of a modified heat control circuit is depicted in FIG. 2. Specifically, heating medium discharged from the tubing coil in stream 38 is delivered to an inlet valve 101 of circuit 100. The heating medium passes through valve 101 and a check valve 102. A circulation pump 104 receives the heating medium from check valve 102, via stream 103, and pumps the heating medium in stream 105 to a first heater unit 108. A bypass stream 106, including a relief valve 107, connects at a branching section to each of streams 105 and 103 proximate the pump inlet and outlet. The bypass stream provides a pressure relief outlet should the heating medium pressure within the circuit exceed a safety threshold value.

Heating medium flowing in stream 105 enters first heater unit 108 and is heated therein. Depending upon the required temperature and flow rate for the heating medium to maintain the selected vapor pressure within the vapor generation tank, the first circulation heater unit may be sufficient to heat the heating medium to the selected temperature (e.g., about 65.6° C.). However, a second heater unit 110 is disposed directly downstream of the first heater unit in the event additional heating of the medium is necessary prior to delivery to the vapor generation tank. Specifically, heating medium is discharged from the first heater unit into stream 109, which conveys the heating medium into second heater unit 110. The second heater unit discharges heating medium in stream 111 at the selected temperature to a diverter valve 112. While two heater units are depicted in FIG. 2, it is noted that any selected number of heater units may be provided depending upon the amount of heat that must be transferred to the heating medium.

Each heater unit is preferably an electrical heater with a suitable heat generating capacity (e.g., about 14 kW) to heat the medium to a variety of selected temperatures for producing ammonia gas in the vapor generation tank at a selected vapor pressure. A first temperature sensor 114 is provided at the outlet of first heater unit 108 to measure the temperature of the heating medium in stream 109. Similarly, a second temperature sensor 116 is provided at the outlet of second heater unit 110 to measure the temperature of the heating medium in stream 111. A circuit controller 120 is coupled to each of the first and second heater units as well as the first and second temperature sensors (e.g., via electrical wiring and/or wireless connections, as indicated by dashed lines 115 and 117 in FIG. 2) so as to effect independent control of each heater unit in response to measured temperature information provided at the outlet of each heater unit. For example, when the first heater unit fails to heat the medium to the selected temperature, as indicated by the outlet temperature of the heating medium measured by the first temperature sensor, the circuit controller controls the amount of heat applied by the second heater unit to achieve the selected temperature for the medium upon being discharged from the second heater unit.

Circuit 100 provides additional safety features for the heater units. In particular, first and second high temperature cut-off sensors 118, 119 are provided to measure the temperature of the heating elements of the respective first and second heater units and/or the temperature of heating medium being heated by these heater units. The cut-off sensors are coupled to the circuit controller. When a threshold temperature is exceeded by either of the heater units, its respective high temperature cut-off sensor disables that heater to prevent excessive heating of the heating medium. In addition, each heater unit will become disabled if its corresponding temperature sensor fails to provide temperature information to the circuit controller.

The diverter valve of circuit 100 performs a similar function as bypass valve 44 in circuit 40 described above and illustrated in FIG. 1. In particular, diverter valve 112 includes an input end to receive heating medium from second heater unit 110 in stream 111, and a pair of output ends to facilitate flow of heating medium to along at least one of two separate paths in circuit 100. The first output end of the diverter valve directs heating medium into stream 122 and to an outlet valve 123. The heating medium exits circuit 100 through outlet valve 123 and enters stream 37, which delivers the medium to the inlet of tubing coil 36. The second output end of the diverter valve directs heating medium into a stream 124 that connects at a branching section with stream 103 upstream of pump 104. Diverter valve 112 is coupled to vapor generation controller 27 described above and depicted in FIG. 1 (e.g., via electrical wiring and/or other wireless connections, as indicated by dashed line 45 shown in FIGS. 1 and 2).

The vapor generation controller effects opening or closing of the diverter valve to control flow of heating medium through circuit 100 and to the tubing coil based upon pressure and/or temperature measurements within the vapor generation tank as described above. For example, when the vapor pressure and/or liquid ammonia temperature within tank 2 exceed their selected values, controller 27 effects a selected degree of closing (e.g., partial or complete closure) of the first output end of diverter valve 112 to divert at least a portion of the heating medium through the second output end of the diverter valve and back to pump 104, thus reducing the flow of heating medium through tubing coil 36 in tank 2. Alternatively, when the vapor pressure and/or temperature values drop below their selected values, controller 27 effects a selected degree of closing (e.g., partial or complete closing) of the second output end of diverter valve 112 to force some or all of the heating medium through the first output end of the diverter valve so as to exit circuit 100 and enter stream 37.

Circuit controller 120 is also coupled to pump 104 (via electrical wiring and/or other wireless connections, as indicated by dashed line 125 shown in FIG. 2) to control both speed and activation/disabling of the pump during system operation. As previously noted, liquid ammonia within tank 2 requires cooling during initial system startup, particularly before enough ammonia gas has been generated to create a cooling effect for the liquid ammonia. During this phase of system operation, it may be desirable to suspend circulation of heating medium through the tubing coil. Accordingly, circuit controller 120 can effect disabling of the pump until such time when heating is required. Additionally, the circuit controller can adjust heating medium flow rates via pump 104 depending, for example, upon changing ammonia gas flow rate requirements for a particular manufacturing process. An expansion/fill tank 130 including additional heating medium is disposed in line and in fluid communication with stream 103 upstream of pump 104 to facilitate the addition or removal of heating medium to be circulated through circuit 100 and tubing coil 36. Thus, the independent control of the pump and a pair of circulation heater units by circuit 100 facilitates greater control of the flow rate and pressure of ammonia gas produced and delivered to a manufacturing process during system operation.

Figure 3:
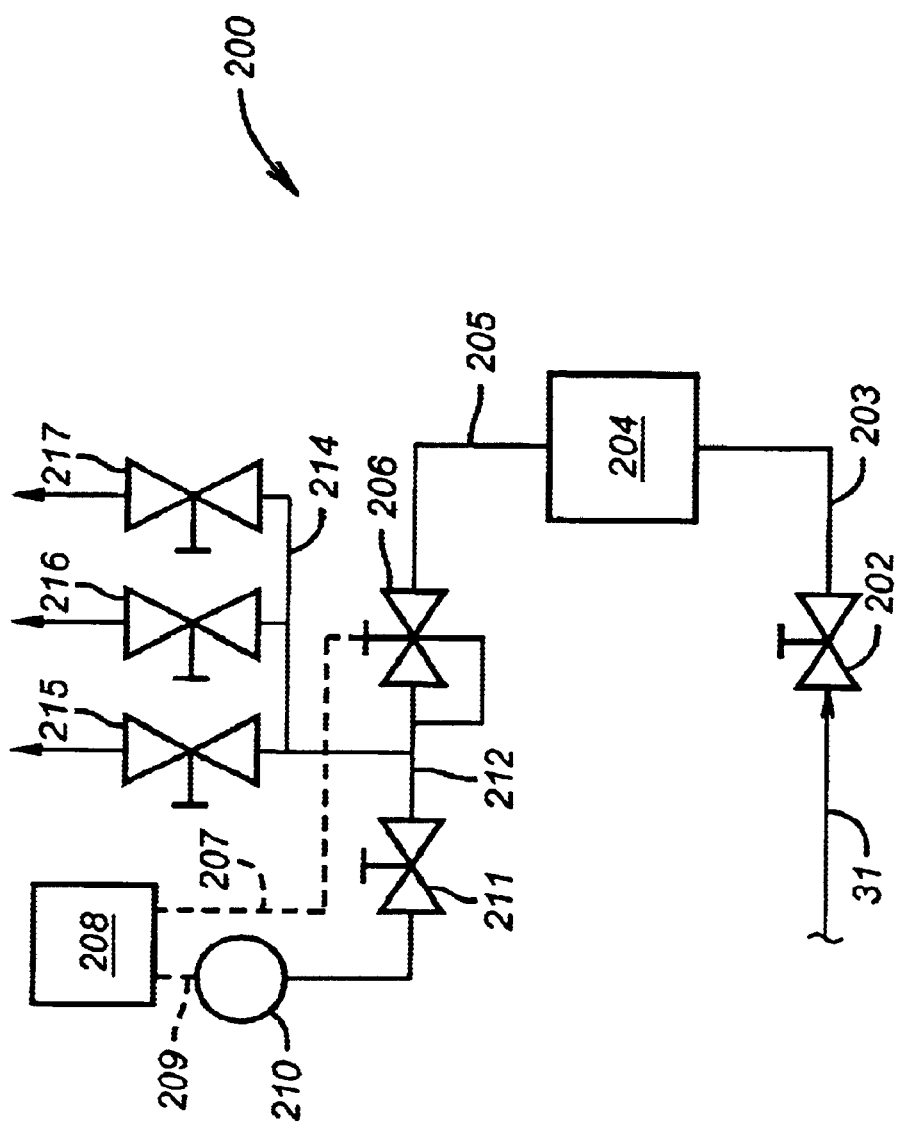
FIG. 3 is flow diagram of an exemplary delivery circuit for delivering ammonia gas from the vapor generation tank in the system of FIG. 1 in multiple streams for a particular process.

An exemplary embodiment of a delivery circuit for providing ammonia gas from the system of FIG. 1 to a manufacturing process is depicted in FIG. 3. The delivery circuit includes a pressure regulator to closely monitor and control the vapor pressure and a distribution manifold to divide the ammonia gas into any selected number of streams for delivery to one or more facilities. Specifically, delivery circuit 200 includes a stop valve 202 located immediately downstream from vapor generation tank 2 and pressure relief valve 33 (or valves) to receive ammonia gas from the tank via outlet stream 31. Ammonia gas is discharged from valve 202 into stream 203 and passed through a filter 204. Filter 204 may be any commercially available or other filter type suitable for filtering contaminants of varying sizes from the ammonia gas. The filter removes any particulate matter (e.g., metallic particles, debris associated with operation of valves upstream of the filter, etc.) that could negatively impact operation of the pressure regulator. The filter further serves to reduce or eliminate the amount of mist that may exist in the ammonia vapor exiting the vapor generation tank.

The filtered ammonia gas is directed in stream 205 to a pressure regulator 206. Preferably, regulator 206 is a dome loaded pressure regulator coupled to a controller 208 (e.g., via electrical wiring and/or other wireless connections, as indicated by dashed line 207 in FIG. 3), where the controller closely monitors the pressure of the ammonia gas and adjusts the regulator accordingly to ensure the pressure of the gas remains constant during as it is delivered to the manufacturing process. A pressure sensor 210, also coupled to the controller (e.g., via electrical wiring and/or other wireless connections, as indicated by dashed line 209 in FIG. 3), measures the pressure of the gas exiting the pressure regulator in stream 212 via a valve 211 connected at a branch section of stream 212. The pressure sensor provides measured pressure information to controller 208 to facilitate control of the pressure regulator.

Stream 212 exiting the pressure regulator delivers the ammonia gas at a constant pressure to a distribution manifold 214. A series of gas lines including valves 215, 216 and 217 branch from the manifold to deliver ammonia gas to one or more manufacturing and/or distribution facilities. While three valves are depicted, it is noted that any suitable number of branching lines may be connected to the manifold. Thus, the manifold splits the ammonia gas into any selected number of branch lines for delivery to any one or more facilities at one or more selected flow rates.

The system of the present invention facilitates the delivery of high purity ammonia gas at a substantially constant flow rate to any number of manufacturing and/or distribution facilities by maintaining a substantially constant vapor pressure and liquid temperature within the vapor generation tank. When the liquid ammonia feed source is at room temperature (e.g., about 21° C.), the differential pressure between the source and the vapor generation tank facilitates delivery of the ammonia feed at a sufficient flow rate without the need for pumps or other pressure regulating devices. The reduction in temperature of the liquid ammonia provided in the vapor generation tank yields a corresponding reduction in the vapor pressure of ammonia gas to a level that requires little or no pressure regulation as well as a minimization of potential Joules-Thompson effects of the ammonia prior to delivery to manufacturing or other facilities.

The precise monitoring and control of heat transfer applied both internally and externally to the contents of the vapor generation tank, as well as the precise monitoring and control of the liquid level within the vapor generation tank provide the system with the ability to maintain a substantially constant vapor pressure within the tank over a selected range of desirable vapor flow rates. Further, the blow down connection feature permits periodic purging of the bottom contents of the vapor generation tank to prevent a build-up of contaminants within the tank.

In addition, the system is equipped with various safety features including pressure relief valves and high temperature cut-off sensors to control system operating temperatures and pressures, and a liquid level sensor and/or scale to control liquid levels within the supply source and vapor generation tank. In addition, the system may include gas detectors to provide an indication of the presence of ammonia or any other undesirable gas within the system environment during system operation.

Having described novel ammonia vapor generation systems and corresponding methods, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An ammonia vapor generation system comprising:
   a liquid ammonia supply source;
   a vapor generation tank including an inlet to receive liquid ammonia from the supply source and an outlet to discharge ammonia gas from the vapor generation tank;
   a first heat transfer system to cool liquid ammonia fed from the supply source to the vapor generation tank and to provide external cooling to the vapor generation tank; and
   a second heat transfer system to heat liquid ammonia within the vapor generation tank;
   wherein the first and second heat transfer systems facilitate the discharge of ammonia gas from the vapor generation tank at a substantially constant flow rate.

2. The system of claim 1, further comprising:
   a vapor generation controller; and
   at least one sensor to measure a physical property of ammonia within the vapor generation tank, the at least one sensor being coupled to the vapor generation controller to provide measured information to the controller;
   wherein the vapor generation controller controls the amount of heat transferred to liquid ammonia within the vapor generation tank by the second heat transfer system based upon measured information received by the at least one sensor.

3. The system of claim 2, wherein the at least one sensor includes at least one of a pressure sensor to measure the vapor pressure in the vapor generation tank and a temperature sensor to measure the temperature of liquid ammonia in the vapor generation tank.

4. The system of claim 2, wherein the second heat transfer system comprises:
   a heating conduit disposed within the vapor generation tank; and
   a heat control circuit disposed externally from the vapor generation tank and in fluid communication with the heating conduit to circulate a heating medium through the heating conduit during system operation, the heat control circuit including:
      a heating section to heat the heating medium to a selected temperature;
      a pump to facilitate circulation of heating medium through the heat control circuit and the heating conduit at a selected flow rate; and
      a diverter to selectively divert the flow of heating medium through the beat control circuit so as to control an amount of heating medium exiting the heat control circuit for delivery to the heating conduit;
   wherein the diverter is coupled to the vapor generation controller to facilitate control of the diverter by the vapor generation controller based upon the measured information received by the at least one sensor.

5. The system of claim 4, wherein the heat control circuit further comprises:
   a temperature sensor to measure the temperature of the heating medium prior to delivery to the heating conduit; and
   a circuit controller coupled to each of the temperature sensor and the heating section;
   wherein the circuit controller controls the heating section to heat the heating medium to the selected temperature based upon measured temperature information provided to the circuit controller from the temperature sensor.

6. The system of claim 4, wherein the heating section comprises a first heater and a second heater disposed in series along a flow path of the heat control circuit, and the heat control circuit further comprises:
   a first temperature sensor disposed at an outlet of the first heater to measure the temperature of heating medium exiting the first heater;
   a second temperature sensor disposed at an outlet of the second heater to measure the temperature of heating medium exiting the second heater; and
   a circuit controller coupled to the first and second temperature sensors and the first and second heaters;
   wherein the circuit controller independently controls heating of heating medium within each heater, based upon measured temperature information from each temperature sensor, so as to achieve the selected temperature for the heating medium to be delivered to the heating conduit.

7. The system of claim 6, wherein the heat control circuit further comprises:
   a first temperature cut-off sensor to disable the first heater in response to the first heater exceeding a first heating temperature threshold value; and a second temperature cut-off sensor to disable the second heater in response to the second heater exceeding a second heating temperature threshold value.

8. The system of claim 6, wherein the circuit controller is further coupled to the pump to facilitate control of the pump and the flow rate of heating medium to the heating conduit during system operation.

9. The system of claim 8, wherein the heat control circuit further comprises:
a heating medium tank disposed upstream of the pump to facilitate the addition of heating medium to and the removal of heating medium from the heat control circuit during system operation.

10. The system of claim 1, wherein the first heat transfer system comprises:
a pump to circulate heat transfer fluid through the first heat transfer system;
a heat exchanger disposed between the supply source and the vapor generation tank to receive heat transfer fluid from the pump and facilitate cooling of liquid ammonia by the heat transfer fluid to a selected temperature;
a thermal transfer jacket disposed around an exterior surface of the vapor generation tank to receive heat transfer fluid from the heat exchanger; and
a thermal transfer unit disposed upstream of the heat exchanger to thermally treat the heat transfer fluid prior to being recycled to the heat exchanger via the pump.

11. The system of claim 10, wherein the first heat transfer system further comprises:
a temperature sensor disposed upstream of the thermal transfer unit to measure the temperature of heat transfer fluid; and
a heat controller coupled to the temperature sensor and the thermal transfer unit;
wherein the heat controller facilitates control of heat transfer between the heat transfer unit and the heat transfer fluid based upon measured temperature information received from the temperature sensor.

12. The system of claim 1, further comprising:
a liquid ammonia level sensor to continuously measure the level of liquid ammonia disposed within the vapor generation tank during system operation;
wherein the system is configured to control the level of liquid ammonia within the vapor generation tank based upon measurements of the level sensor.

13. The system of claim 1, further comprising:
a scale supporting the vapor generation tank to continuously measure the weight of the vapor generation tank during system operation;
wherein the system is configured to control the amount of liquid ammonia within the vapor generation tank based upon measurements of the scale.

14. The system of claim 1, wherein the vapor generation tank further includes a second outlet disposed at a lower section of the vapor generation tank, and the system further comprises:
a collection vessel in fluid communication with the second outlet of the vapor generation tank; and
a valve disposed between the collection vessel and the vapor generation tank to facilitate periodic removal of a fraction of liquid ammonia within the vapor generation tank for transfer to the collection vessel.

15. The system of claim 1, further comprising a delivery circuit in fluid communication with the outlet of the vapor generation vessel, the delivery circuit comprising:

a filtration unit to filter contaminants from the ammonia gas exiting the vapor generation tank;
a pressure regulator to control the pressure of ammonia gas flowing through the regulator; and
a distribution manifold including a plurality of branching streams to split ammonia gas flowing through the regulator into the plurality of branching streams for delivery to at least one facility.

16. The system of claim 1, wherein the liquid ammonia supply source includes a pressure vessel, and the system further comprises:
a scale supporting the pressure vessel to continuously measure the weight of the pressure vessel during system operation;
wherein the system is configured to maintain the amount of liquid ammonia within the pressure vessel within a selected range to ensure a substantially constant supply of liquid ammonia fed to the vapor generation tank.

17. The system of claim 1, wherein the vapor generation tank includes a capacity for producing ammonia gas at a rate of at least about 1000 standard liters per minute.

18. A method for generating ammonia vapor utilizing a system including a liquid ammonia supply source, a vapor generation tank, a first heat transfer system and a second heat transfer system, the method comprising:
providing liquid ammonia at a substantially constant flow rate from the supply source to the vapor generation tank to facilitate the generation of ammonia gas within the vapor generation tank;
cooling the liquid ammonia to a selected temperature via the first heat transfer system prior to the liquid ammonia entering the vapor generation tank;
externally cooling the vapor generation tank via the first heat transfer system for at least a first time period after initiation of system operation so as to substantially maintain the liquid ammonia within the vapor generation tank at the selected temperature; and
heating the liquid ammonia within the vapor generation tank via the second heat transfer system after the first time period so as to substantially maintain the liquid ammonia within the vapor generation tank during generation of ammonia gas; and
discharging ammonia gas from the vapor generation tank at a substantially constant flow rate.

19. The method of claim 18, wherein the selected temperature of the liquid ammonia is about 10° C.

20. The method of claim 18, wherein ammonia gas is discharged from the vapor generation tank at a flow rate of about 1000 standard liters per minute and a pressure of about 500 kPa absolute.

21. The method of claim 18, wherein the system further includes a vapor generation controller and at least one temperature sensor coupled to the vapor generation controller, the method further comprising:
measuring a physical property of the ammonia within the vapor generation tank via the at least one temperature sensor; and
controlling the amount of heat transferred to liquid ammonia within the vapor generation tank by the second heat transfer system, via the vapor generation controller, based upon measured information provided to the vapor generation controller by the at least one sensor.

22. The method of claim 21, wherein the at least one sensor includes at least one of a pressure sensor to measure the vapor pressure in the vapor generation tank and a temperature sensor to measure the temperature of liquid ammonia in the vapor generation tank.

23. The method of claim 21, wherein the system further includes a heating conduit disposed within the vapor generation tank, and the second heat transfer system includes a heat control circuit disposed externally from the vapor generation tank, the heat control circuit including a heating section, a pump and a diverter, the diverter being coupled to the vapor generation controller, the method further comprising:

circulating heating medium through the heat control circuit and the heating conduit via the pump;

heating the heating medium, via the heating section, to a selected temperature prior to delivery to the heating conduit; and controlling the amount of heat transferred to liquid ammonia within the vapor generation tank by selectively diverting the flow of heating medium, via the diverter as controlled by the vapor generation controller, within the heat control circuit and the amount of heating medium delivered to the heating conduit based upon the measured information provided to the vapor generation controller by the at least one sensor.

24. The method of claim 23, wherein the heating medium is heated to a temperature of at least about 65° C. prior to delivery to the heating conduit.

25. The method of claim 23, wherein the heat control circuit further includes a temperature sensor and a circuit controller coupled to the temperature sensor and the heating section, the method further comprising:

measuring the temperature of heating medium, via the temperature sensor, prior to delivery to the heating conduit; and controlling the heating section, via the circuit controller, to heat the heating medium to the selected temperature based upon measured temperature information provided to the circuit controller by the temperature sensor.

26. The method of claim 23, wherein the heating section includes first and second heaters disposed in series in a flow path of the heat control circuit, the heat control circuit further includes first and second temperature sensors and a circuit controller coupled to the first and second temperature sensors and the first and second heaters, the method further comprising:

measuring the temperature of heating medium exiting the first heater via the first temperature sensor;

measuring the temperature of heating medium exiting the second heater via the second temperature sensor; and independently controlling each of the first and second heaters, via the circuit controller, to heat the heating medium to the selected temperature prior to delivery to the heating conduit based upon measured temperature information provided to the circuit controller by the first and second temperature sensors.

27. The method of claim 26, wherein the heat control circuit further comprises first and second temperature cut-off sensors, each cut-off sensor being coupled to a respective heater in the heat control circuit, the method further comprising:

disabling the first heater in response to the first cut-off sensor measuring a temperature corresponding to the first heater that exceeds a first threshold value; and disabling the second heater in response to the second cut-off sensor measuring a temperature corresponding to the second heater that exceeds a second threshold value.

28. The method of claim 26, wherein the circuit controller is further coupled to the pump, the method further comprising:

selectively controlling the pump, via the circuit controller, to vary the flow rate of heating medium through the heat control circuit and heating conduit during system operation.

29. The method of claim 18, wherein the first heat transfer system includes a pump, a heat exchanger disposed between the supply source and the vapor generation tank, a thermal transfer jacket disposed around an exterior surface of the vapor generation tank, and a thermal transfer unit, the method further comprising:

circulating heat transfer fluid through the first heat transfer system via the pump;

cooling the liquid ammonia to the selected temperature prior to the liquid ammonia entering the vapor generation tank by flowing the liquid ammonia from the supply source through the heat exchanger while heat transfer fluid also flows through the heat exchanger;

externally cooling the vapor generation tank for at least the first time period after initiation of system operation by flowing heat transfer fluid through the thermal transfer jacket;

thermally treating the heat transfer fluid, via the thermal transfer unit, prior to circulation to the heat exchanger; and recycling the thermal transfer fluid from the thermal transfer unit to the heat exchanger.

30. The method of claim 29, wherein the first heat transfer system further includes a temperature sensor and a heat controller coupled to the temperature sensor and the thermal transfer unit; the method further comprising:

measuring the temperature of heat transfer fluid upstream of the thermal transfer unit; and controlling the thermal transfer unit, via the heat controller, to regulate the amount of heat transfer between the heat transfer unit and the heat transfer fluid based upon temperature information provided to the heat controller from the temperature sensor.

31. The method of claim 18, wherein the system further includes a liquid ammonia level sensor, the method further comprising:

utilizing the level sensor to continuously measure the level of liquid ammonia disposed within the vapor generation tank during system operation; and controlling the level of liquid ammonia within the vapor generation tank based upon measurements provided by the level sensor.

32. The method of claim 18, wherein the system further includes a scale supporting the vapor generation tank, the method further comprising:

utilizing the scale to continuously measure the weight of the vapor generation tank during system operation; and controlling the amount of liquid ammonia within the vapor generation tank based upon measurements provided by the scale.

33. The method of claim 18, wherein the vapor generation tank includes an outlet disposed at a lower section of the vapor generation tank, and the system further includes a collection vessel in fluid communication with the outlet of the vapor generation tank and a valve disposed between the vapor generation tank and the collection vessel, the method further comprising:

periodically opening the valve to facilitate removal of a fraction of liquid ammonia within the vapor generation tank for transfer to the collection vessel.

34. The method of claim 18, wherein the system further includes a delivery circuit including a filtration unit, a pressure regulator and a distribution manifold including a plurality of branching streams, the method further comprising:

flowing ammonia gas discharged from the vapor generation tank through the filtration unit;

flowing the filtered ammonia gas through the pressure regulator to control the pressure of the filtered ammonia gas; and flowing the filtered ammonia gas exiting the pressure regulator through the manifold to divide the ammonia gas into the plurality of branching streams.

35. The method of claim 18, wherein the supply source includes a pressure vessel, and the system further includes a scale supporting the pressure vessel, the method further comprising:

utilizing the scale to continuously measure the weight of the pressure vessel during system operation; and controlling the amount of liquid ammonia within the pressure vessel, based upon measurements provided by the scale, so as to establish a substantially constant flow of liquid ammonia fed from the pressure vessel to the vapor generation tank.

* * * * *

UNITED STATES PATENT AND TRADEMARK OFFICE
CERTIFICATE OF CORRECTION

PATENT NO. : 6,647,930 B2
DATED : November 18, 2003
INVENTOR(S) : Douglas B. Nurmi It is certified that error appears in the above-identified patent and that said Letters Patent is hereby corrected as shown below:

Column 12,
Line 25, please replace the word "beat" with the word -- heat --.

Signed and Sealed this

Twenty-second Day of June, 2004

JON W. DUDAS
*Acting Director of the United States Patent and Trademark Office*